3,766,176
CERTAIN 7 - (o-AMINOMETHYLPHENYL-THIO-ACETAMIDO) - 3 - [(HETEROCYCLYLTHIO) METHYL]CEPH-3-em-4-CARBOXYLIC ACIDS
Raymond Urgel Lemieux and Rintje Raap, Edmonton, Alberta, Canada, assignors to R & L Molecular Research Ltd., Edmonton, Alberta, Canada
No Drawing. Filed May 11, 1971, Ser. No. 142,338
Int. Cl. C07d 99/24
U.S. Cl. 260—243 C
19 Claims

ABSTRACT OF THE DISCLOSURE 7-(o-aminomethylphenylthioacetamido)-3-[(1-methyl-5 - tetrazolylthio)methyl]ceph-3-em-4-carboxylic acid, 7- (o-aminomethylphenylthioacetamido)-3-[(5-methyl-1,3,4-thiadiazolylthio)methyl]-ceph-3-em-4-carboxylic acid and 7 - (o-aminomethylphenylthio)-acetamido-3-[S-(1,2,3-triazole - 5-yl)-thiomethyl]-ceph-3-em-4-carboxylic acid and their nontoxic, pharmaceutically acceptable salts are valuable as antibacterial agents, as nutritional supplements in animal feeds and as therapeutic agents in poultry and animals, including man, and are especially useful in the treatment of infectious diseases caused by many Gram-positive and Gram-negative bacteria. 7-(o-aminomethyl-phenylthio)acetamido - 3 - [(1 - methyl-5-tetrazolylthio) methyl]ceph - 3-em-4-carboxylic acid is prepared, for example, by treatment at 0° C. with trifluoroacetic acid of the corresponding compound in which the free amino group is protected with a tert.-butoxycarbonyl group.

BACKGROUND OF THE INVENTION (1) Field of the invention

The cephalosporins of the present invention possess the usual attributes of such compounds and are particularly useful in the treatment of bacterial infections.

(2) Description of the prior art

Cephalothin and cephaloridine are well-known antibacterial agents; see U.S. Pats. 3,218,318; 3,449,338 and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29,494) and South Africa 67/1260 (Farmdoc 28,654). Newer cephalosporins include cephazolin and cephapirin; see U.S. Pat. 3,516,997 [and also Netherlands 68/05179 (Farmdoc 34,328) and South Africa 68/4513] and U.S. Pat. 3,422,100.

The literature on cephalosporins has been reviewed, for example, by E. P. Abraham, Pharmacol, Rev. 14, 473–500 (1962), by I. M. Rollo, Ann. Rev. Pharmacol, 6, 218–221 (1966) by E. P. Abraham, Quart. Rev. (London) 21, 231 (1967), by E. Van. Heyningen. Advan. Drug Res., 4, 1–70 (1967), by G. T. Stewart, The Penicillin Group of Drugs, Elsevier Publishing Company, New York, N.Y. (1965) at pages 185–192 and briefly in Annual Reports in Medicinal Chemistry, Academic Press, Inc., 111 Fifth Avenue, New York, N.Y., 10003, by L. C. Cheney on pages 96 and 97 (1967) and by K. Gerzon and R. B. Morin on pages 90–93 (1968) and by K. Gerzon on pages 78–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969) and by Nishida et al., ibid, 236–243 (1970).

7-Phenylacetamidocephalosporanic acid has also been named N-phenylacetyl derivative of 7-ACA, cephaloram, PACA and apparently phenasporin. Publications in the scientific literature on the preparation and/or properties of this compound, with or without substituents in the benzene rings, and corresponding compounds in which the 3-acetoxymethyl group as been replaced by methyl, hydroxymethyl and/or pyridiniummethyl include the following:

Chauvette, R. R., et al. "Chemistry of Cephalosporin Antibiotics II. Preparation of a New Class of Antibiotics and the Relation of Structure To Activity," Journal of the American Chemical Society, 84, 3401–3402 (1962).

Chauvette, R. R., et al. "Structure-Activity of Relationships Among 7-Acylamidocephalosporanic Acids," Antimicrobial Agents and Chemotherapy—1962, 687–694.

Cocker, J. D., et al., "Cephalosporanic Acids. Part II. Displacement of the Acetoxy-group by Nucleophiles," Journal of the Chemical Society, 5015–5031 (1965).

Cocker, J. D., et al., "Cephalosporanic Acids. Part IV. 7 - Acylamidoceph-2-em-4-carboxylic Acids," Journal of the Chemical Society, 1142–1151 (1966).

Culp, H. W., et al., "Metabolism and Absorption of 7-(Phenylacetamido - 1-C[14])-Cephalosporanic Acid," Antimicrobial Agents and Chemotherapy—1963, 243–246.

Jago, M., "Antibacterial Activity of Some Derivatives of 7-Aminocephalosporanic acid Against *Staphylococcus Aureus* and Synergism Between These and Other Antibiotics," Brit. J. Pharmacol., 22, 22–33 (1964).

Loder, B., et al., "The Cephalosporin C Nucleus (7-Aminocephalosporanic Acid) and some of its Derivatives," Biochemical Journal, 79, 408–416 (1961).

Nishida, M., et al., "Studies on Microbial Degradation of Cephalosporin C Derivatives, II," The Journal of Antibiotics, 21, 375–378 (1968).

Nishida, M., et al., "Studies of Microbial Degradation of Cephalosporin C Derivatives I, The Journal of Antibiotics, 21, 165–169 (1968).

Spencer, J. L., et al., "Chemistry of Chephalosporin Antibiotics VIII. Synthesis and Structure-Activity Relationships of Cephaloridine Analogues," Antimicrobial Agents and Chemotherapy—1966, 573–580.

Stedman, R. J. et al., "7 - aminodesacetoxycephalosporanic Acid and Its Derivatives," J. Med. Chem., 7(1), 117–119 (1964).

Sullivan, H. R., et al., "Metabolism of Oral Cephalothin and Related Cephalosporins in the Rat," Biochemical Journal, 102, 976–982 (1967).

Vymola, F., et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4(α-aminoalkyl)phenylacetamido]cephalosporanic acids (U.S. Pat. 3,382,241), 7-[(p-aminophenylthio)acetamido]cephalosporanic acid (U.S. Pat. 3,422,-

100), 7-halophenylthioacetamido)cephalosporanic acids (U.S. Pat. 3,335,136) and the nearly unlimited number of variations of such compounds encompassed by the generic formulate (and often not otherwise described) of such patents as Netherlands 69/02013 (Farmdoc 39,172). 7-(p-aminophenylacetamido) - cephalosporanic acid is disclosed in U.S. Pat. 3,422,103 as is the corresponding N-trityl derivative; see also Japan 2712/67 (Farmdoc 25,406).

U.S. Pat. 3,219,662 includes claims to compounds of the structure R—CH$_2$—CO—ACA in which R is phenyl, nitrophenyl (especially para-nitro), chlorophenyl, alkylphenyl and alkoxyphenyl and the corresponding phenoxy and substituted compounds and for all of those the corresponding compounds in which the 3-acetoxymethyl group has been replaced by a 3-pyridiniummethyl group. A more extensive group of such compounds, including the series in which R is phenylthio and also the compounds in which R is benzyl [i.e., 7-($\beta$-phenylpropionamido)cephalosporanic acid], alkoxybenzyl, alkanoyloxybenzyl, aminobenzyl, etc. are disclosed, at least generically, for use as starting materials in Great Britain 1,012,943 and 1,153,421 (Farmdoc 23,984) and see also Great Britain 1,001,478 and U.S. 3,280,118. Additional 7-phenylacetamidocephalosporanic acids having substituents on the benzene ring including hydroxy and amino are disclosed as starting materials in Great Britain 1,082,943 and 1,082,962.

U.S. Pat. 3,341,531 describes the 7-(o-, m- and p-carboxamidomethylphenylacetamido)cephalosporanic acids and their betaines. A variety of 7-(halo-, dihalo, nitro- and halonitro-phenylacetamido)cephalosporanic acids are named as starting materials for reaction with certain nucleophiles in U.S. Pat. 3,431,259 (Farmdoc 27,715). Additional 7-(phenylacetamido)cephalosporanic acids having various substitutents on the benzen ring are disclosed in Japan 2712/67 (Farmdoc 25,406), Japan 26105/69 (Farmdoc 40,860), Great Britain 1,178,471 (Farmdoc 27,715, see Netherlands 67/00906) and Japan 25785/69 (Farmdoc 40,847).

Replacement of the 3-acetoxy group of a cephalosporin by various heterocyclic thiols has been disclosed.

(a) in South Africa 70/2290 [see also Netherlands 70/05519 (Farmdoc 80,188R)] where the sidechains were, for example, 7α-aminophenylacetamido and typical heterocyclic thiols were 2-methyl-1,3,4-thiadiazole-5-thiol and 1-methyl-1,2,3,4-tetrazole-5-thiol, and (b) in U.S. 3,516,997 where the sidechains at the 7-position had structures such as R$^3$-(alk)m—CO—NH— and R$^3$—S—(alk)m—CO—NH— in which R$^3$ was one of many aromatic heterocycles and the numerous heterocyclic thiols at the 3-position included, for example, 1-methyl-tetrazole-5-thiol and 2-methyl-1,3,4-thiadiazolo-5-thiol, and (e) in U.S. Pat. 3,563,983.

It is believed that 7-[(o-aminomethylphenylthio)acetamido]cephalosporanic acid and its 3-desacetoxy-3-pyridinium derivative were described for the first time in our prior, copending application Ser. No. 47,916 filed June 19, 1970 and Ser. No. 65,311, filed Aug. 19, 1970, respectively.

U.S. Pat. 3,492,297 includes 7-(p-guandinophenylacetamido)cephalosporanic acid and its betaine.

In cephaloridine the 3-acetoxy group of cephalothin was replaced by a pyridinium group as described, for example, in U.S. Pat. 3,449,338 and 3,498,979.

The preparation of various 7-[α-amino-arylacetamido] cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgian Pat. 696,026 (Farmdoc No. 29,949), in U.S. Pats. 3,311,621, 3,352,858, 3,489,750, 3,489,751, 3,489,752 and 3,518,260, in Japanese Pat. 16871/66 (Farmdoc 23,231), by Spencer et al., J. Med. Chem., 9(5), 746–750 (1966) and by Kurita et al., J. Antibiotics (Tokyo) (A) 19, 243–249 (1966) and see also U.S. Pat. 3,485,819.

Netherlands Pats. 68/11676 (Farmdoc 36,349) and 68/12382 (Farmdoc 36,496) and U.S. Pats. 3,489,750 and 3,489,751 and 3,489,752 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

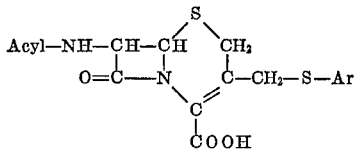

In U.S. Pat. 3,278,431 Ar is phenyl or certain substituted phenyls or certain aromatic heterocylic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition h for R$_3$. Additional nucleophiles of this type were disclosed by Fujisawa in Belgium 714,518 (Farmadoc 35,-707; Netherlands 68/06129 and South Africa 2695/68), in Canada 818,501 (Farmdoc 38,845), in Great Britain 1,187,323 (Farmdoc 31,936; Netherlands 67/14888) and especially in U.S. 3,516,997 (Farmdoc 34,328; Netherlands 68/05179) which includes the compound named cefazolin, which has a tetrazolylacetyl sidechain on the 7-amino group and 5-methyl-thiadiazolylthiomethyl group at the 3-position and is described at some length in the scientific literature, e.g. in Antimicrobial Agents and Chemotherapy—1969, American Society for Microbiology, Bethesda, Md. at pp. 236–243 and in J. Antibiotics (Japan) 23(3), 131–148 (1970).

Various cephalosporins having the structure

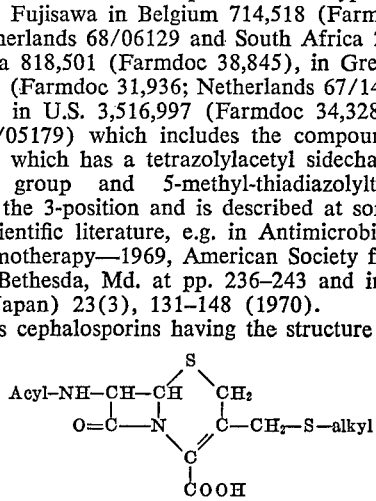

in which acyl represents various sidechains including α-aminophenylacetyl have been described in some of the above and by Glaxo in Belgium 734,532 (Farmdoc 41,-619) and in Belgium 734,533 (Farmdoc 41,620).

Cephalosporins having the structure

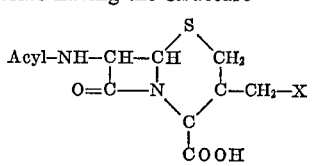

where X includes

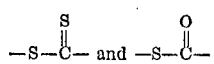

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compounds of the formula

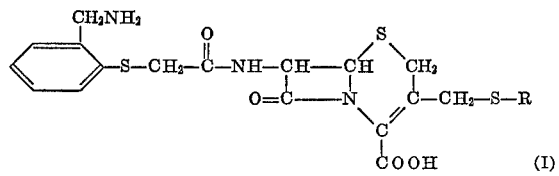

wherein R represents

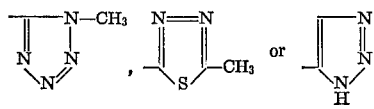

which exist primarily as the zwitterion, and their non-toxic, pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines including triethylamine, procaine, dibenzylamine, N-benzyl-beta-phenethylamine, 1-ephenamine, N,N' - dibenzylethylenediamine, dehydroabietylamine, N,N' - bis - dehydroabietylethylenediamine, N-(lower)-alkylpiperidine, e.g., N - ethylpiperidine, and other amines which have been used to form salts with benzylpenicillin; and the nontoxic, acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with a particular 3-thiolated-7-aminocephalosporanic acid designated II, that is, 7-amino-3-(5-methyl-1,3,4-thiadiazol-2-ylthiomethyl)-3-cephem-4-carboxylic acid (IIa) or 7 - amino-3-[S-(1,2,3-triazole-5-yl)-thiomethyl] - 3 - cephem - 4 - carboxylic acid (IIb) or 7-amino-3-(1-methyl-1,2,3,4-tetrazole-5-thiomethyl)ceph - 3 - em-4-carboxylic acid (IIc) or a salt or easily hydrolyzed ester thereof (including those of U.S. Pat. 3,284,451 and any of the silyl esters described in U.S. Pat. 3,249,622 for use with 7-amino-penicillanic acid and used in Great Britain 1,073,-530) a particular acid or its functional equivalent as an acylating agent for a primary amino group. After coupling, the blocking group is removed to give the desired product. Said acid has the formula

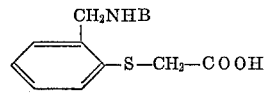

wherein B represents a blocking group of the type used either in peptide syntheses or in any of the numerous synthesis of α-aminobenzylpenicillin from 2-phenylglycine. Particularly valuable blocking groups are a proton, as in the compound of the formula

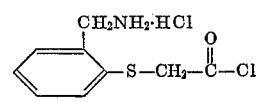

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008, 170 and Novak and Weichet, Experientia XXI, 6, 360, (1965)] or by the use of enzymes or of an N,N'-carbonyldiimidazole or an N,N'-carbonylditriazole [cf. South African patent specification 63/2684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)] or of alkylylamine reagent [ct. R. Buijle and H. G. Viehe, Angew. Chem. International Edition 3, 582 (1964)], or of a ketenimine reagent [cf. C. L. Stevens and M. E. Mond, J. Amer Chem. Soc., 80, (4065)] or of an isoxasolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125, 250 or 500 mg. of active ingredient with suitable physologically acceptable carriers or excipients. The dosage units are in the form of liquid preparations such as solutions or suspensions.

STARTING MATERIALS

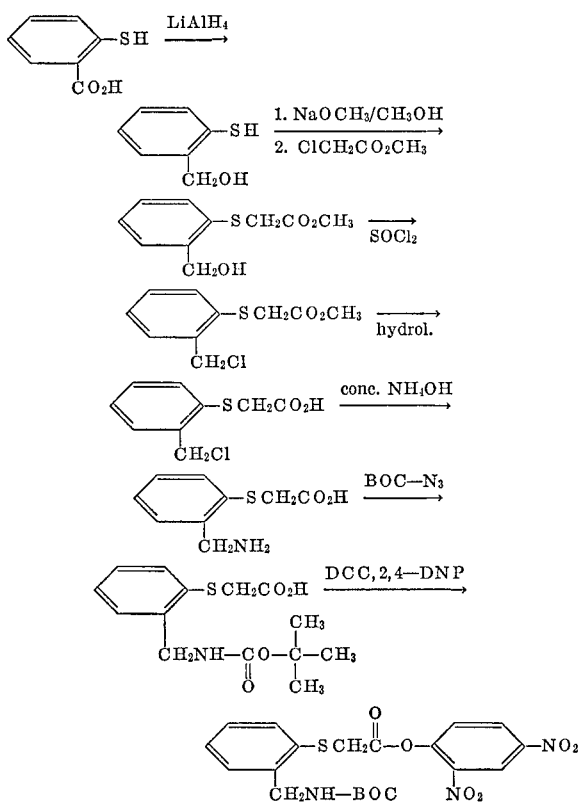

o-Mercaptobenzyl alcohol

A solution of thiosalicylic acid (154.0 g., 1.0 mole) in a mixture of anhydrous ether (1 l.) and tetrahydrofuran (250 ml.) was added dropwise to a stirred suspension of lithium aluminum hydride (42.0 g., 1.1 mole) in 1 l. of anhydrous ether over a period of 2 h. When the addition was completed the reaction mixture was heated under reflux for an additional 4 h. and was then left overnight. After the excess of lithium aluminum hyride was destroyed by the addition of some ethyl acetate, the mixture was poured into 1500 ml. of ice-cooled 3 N hydrochloric acid and stirred for 30 minutes. The layers were separated and the aqueous layer extracted with two 200 ml. portions of ethyl acetate. The combined organic layers were dried, concentrated and distilled to give 105.0 (75%) of product, B.P. 94–96° (0.2 mm.), M.P. 30–32°; reported: B.P. 85° ($10^{-3}$ mm.), M.P. 30–31° [R. Grice and L. N. Owen. J. Chem. Soc., 1947 (1963)]. The distillation residue consisted of the starting thiosalicylic acid (28.0 g).

Methyl (o-hydroxymethylphenylthio)acetate o-Mercaptobenzyl alcohol (91.7 g., 0.655 mole) was added to a solution of sodium methoxide, prepared from 15.1 g. (0.655 g. at) of sodium, in 500 ml. of methanol followed by the dropwise addition of a solution of methyl chloroacetate (71.1 g., 0.655 mole) in 100 ml. of methanol. The reaction mixture was heated under reflux for 1 hr., cooled and filtered. The filtrate was concentrated and the residue taken up in ether. The ether solution was washed with water, dried and concentrated to give 128.0 g. (92%) of the crude product, which could be used directly for the next step. In a small-scale reaction this product was distilled to give a 84% yield of colorless liquid, B.P. 136–138° (0.2 mm.). The infrared spectrum contained the characteristic hydroxyl absorption at 3600–3200 cm.$^{-1}$ and a carbonyl band at 1725 cm.$^{-1}$.

Methyl (o-chloromethylphenylthio)acetate

The crude methyl (o-hydroxymethylphenylthio)acetate (128.0 g., 0.604 mole) was treated at 0° with 250 ml. of thionyl chloride. The mixture was left at 0° for 30 minutes, then at room temperature for another 30 minutes. The excess of thionyl chloride was removed and the residue distilled in vacuo to give 95.5 g. (69%) of yellow colored liquid, B.P. 127–130° (0.1 mm.).

(o-Chloromethylphenylthio)acetic acid

Methyl (o-chloromethylphenylthio)acetate (113.9 g., 0.493 mole) was dissolved in a mixture of acetic acid (1 l.) and 6 N hydrochloric acid (550 ml.) and left at room temperature for 18 h. The mixture was concentrated to approximately half its original volume, diluted with 200 ml. of water, cooled and filtered. The solid was washed with ice-water, dried and recrystallized from ethyl acetate—n-hexane (1:2) to give 84.8 g. (80%) of white needles, M.P. 116–118°. The N.M.R. spectrum (in $CDCl_3$) contained a broad singlet at $\tau$ −1.3 ($CO_2H$), a multiplet at $\tau$ 2.3–2.7 (phenyl protons) and singlets at $\tau$ 5.16 (—$CH_2Cl$) and 6.32 (—S—$CH_2$—) with an integrated area ratio of 1:4:2:2 respectively).

(o-Amnnomethylphenylthio)acetic acid (o-Chloromethylphenylthio)acetic acid (84.8 g., 0.392 mole) was added rapidly with stirring to 1 l. of ice-cooled ammonium hydroxide. The mixture was left at room temperature for 16 h. and was then concentrated to dryness. The solid residue was treated with 200 ml. of methanol, cooled and filtered. The solid was washer with methanol and dried: 39.1 g. of white solid, M.P. 182–186° (dec.). By concentrating the filtrate again to dryness and treating the residue with 100 ml. of methanol, etc., a second crop (16.9 g.), M.P. 182–190° (dec.), of the product was obtained. Total yield: 56.0 (73%). The infrared spectrum (Nujol) showed the characteristics amino acid absorption at approximately 1550 cm.$^{-1}$. The N.M.R. spectrum (in trifluoroacetic acid) contained a multiplet at $\tau$ 2.2–2.7 (phenyl-protons and

a quartet at $\tau$ 5.27

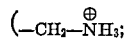

couplings constant J=5.5 Hz.) and a singlet at $\tau$ 5.97 (—S—$CH_2$—) with an integrated area ratio of 7:2:2 respectively).

(o-Tert-butoxycarbonylaminomethylphenylthio)acetic acid

To a stirred and ice-cooled solution of (o-aminomethylphenylthio)acetic acid (19.7 g., 0.10 mole) and triethylamine (24.2 g., 0.24 mole) in 200 ml. of water was added a solution of tert.-butoxycarbonyl azide (17.2 g., 0.12 mole) in 100 ml. of tetrahydrofuran. The reaction mixture was stirred at room temperature for 16 h. and was then concentrated under reduced pressure to remove the tetrahydrofuarn. The aqueous solution was washed twice with ether, layered with 150 ml. of ether, cooled in ice and adjusted to pH 2.5 with 3 N hydrochloric acid. The mixture was filtered and the insoluble white solid washed with ethyl acetate. The layers of the combined filtrate and washings were separated and the organic layer dried. Removal of the solvent yielded 17.4 g. (59%) of oily residue which slowly crystallized upon cooling, M.P. 64–69° (after washing with cold ether). The oil was used for the next step without further purification.

2,4-dinitrophenyl (o-tert-butoxycarbonylaminomethyl-phenylthio)-acetate

N,N'-dicyclohexylcarbodiimide (12.2 g., 0.059 mole) was added in one portion to an ice-cooled solution of (o-tert - butoxycarbonylaminomethylphenylthio)acetic acid (17.4 g., 0.059 mole) and 2,4-dinitrophenlo (10.9 g., 0.059 mole) in 120 ml. of ethyl acetate. The mixture was left at room temperature for 1 hour, then the N,N'-dicyclohexylurea was filtered off and the solvent removed from the filtrate, leaving the activated ester as a viscous yellow oil.

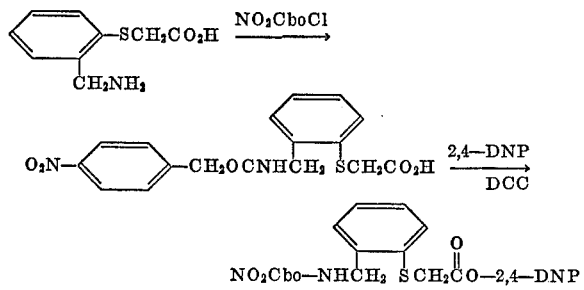

[o-(p'-Nitrocarbobenzoxyaminomethyl)phenylthio]acetic acid

To a stirred suspension of (o-aminomethylphenylthio)-acetic acid (4.53 g., 0.023 mole) in 120 ml. of water is added 1 N aqueous sodium hydroxide until the solution attains pH 10. The clear solution is diluted with 80 ml. of THF (tetrahydrofuran). Next a solution of p-nitrobenzyl chloroformate ($NO_2CboCl$) (5.60 g., 0.026 mole) is added dropwise with stirring at room temperature in approximately 15 minutes. By the simultaneous addition of 1 N aqueous sodium hydroxide the pH is controlled at 7–9. When the addition is completed the solution is extracted with two 100 ml. portions of ethyl acetate. The aqueous solution is cooled and acidified with 20 ml. of 3 N aqueous sulfuric acid. The precipitated oil is extracted with ethyl acetate (2×100 ml.). After drying ($MgSO_4$), the ethyl acetate solution is concentrated to a volume of 50 ml. and cooled to give a white, solid [p-(p'-nitrocarbobenzoxyaminomethyl)phenylthio]acetic acid.

2,4-dinitrophenyl o-(p'-nitrocarbobenzoxy-aminomethyl)phenylthioacetate

N,N'-dicyclohexylcarbodiimide (1.03 g., 0.0050 mole) (DCC) is added to a cold solution of [o-(p'-nitrocarbobenzoxyaminomethyl)phenylthio]acetic acid (1.88 g., 0.0050 mole) and 2,4-dinitrophenol (0.92 g., 0.005 mole) (2,4-DNP) in 10 ml. of anhydrous THF. The mixture is left at room temperature for 1 hr., then the N,N'-dicyclohexylurea is filtered off and the filtrate containing the crude activated ester is concentrated to dryness under reduced pressure.

(o-Tert. - butoxycarbonylaminomethylphenylthio)acetic acid can be prepared in quantitative yield from tert.-butoxycarbonyl azide and the amino acid by using triethylamine as the base.

The BOC-amino acid reacts with thionyl chloride in the presence of triethylamine (methylene chloride as solvent) or pyridine (benzene as solvent) to give the BOC-amino acyl chloride which can be directly coupled with the compound of the formula

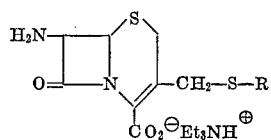

wherein R has the meaning set out above in methylene chloride solution in the presence of triethylamine. The protecting group can subsequently be removed by treatment with cold trifluoroacetic acid.

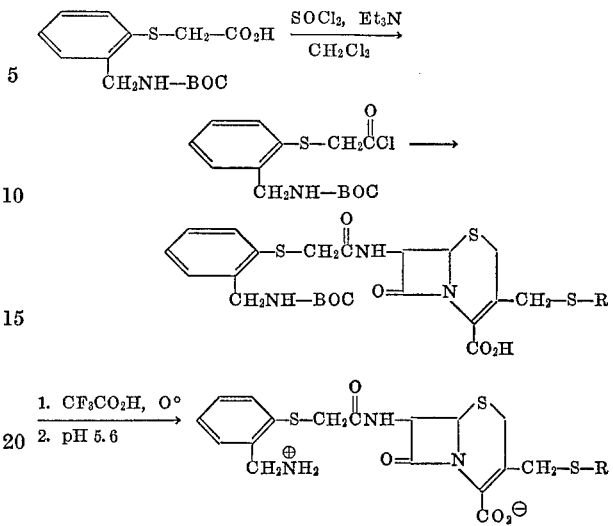

(o-Tert.-butoxycarbonylaminomethylphenylthio) acetic acid

To a stirred and ice-cooled solution of (o-aminomethylphenylthio)acetic acid (7.9 g., 0.040 mole) and triethylamine (10.0 g., 0.10 mole) in 100 ml. of water is added, in one portion, a solution of tert.-butoxycarbonylazide (7.2 g., 0.050 mole) in 75 ml. of tetrahydrofuran. The mixture is stirred at room temperature for 16 hours. Most of the tetrahydrofuran is removed under reduced pressure. The aqueous solution is washed with ether, then layered with 125 ml. of ether and under stirring and cooling the solution is acidified to pH 2.5 with dilute hydrochloric acid. The layers are separated and the aqueous layer is extracted with an additional 150 ml. of ether. The combined ether solutions are dried ($MgSO_4$) and concentrated to dryness, giving (o-tert.-butoxycarbonylaminomethylphenylthio)acetic acid as a solid sufficiently pure for conversion to its acid chloride as follows:

A solution of thionyl chloride (3.00 g., 0.025 mole) in 25 ml. of methylene chloride is added dropwise in 15 minutes to a stirred and ice-cooled solution of (o-tert.-butoxycarbonylaminomethylphenylthio)acetic acid (7.43 g., 0.025 mole) and triethylamine (2.73 g., 0.027 mole) in 50 ml. of methylene chloride. When the addition is completed the mixture is left at 0° for an additional 30 minutes and is then ready for use.

Exactly 200 g. of 7-aminocephalosporanic acid (7–ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluenesulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7–ACA was 145 g.

Reference: Glaxo, British Pat. 1,104,938 (1968).

2-mercapto-5-methyl-1,3,4-thiadiazole

Lit. ref. U.S. Pat. 3,516,997 (1970); J. Antibiotics, 23, 131–36 (1970).

11.5 g. (0.1 mole) of 2-amino-5-methyl-1,3,4-thiadiazole was carefully ground together with 32 g. (0.45 mole) of sodium nitrile and slowly added to 160 ml. of 48% HBr containing 50 mg. of powdered copper at −10° C. with stirring. After the addition was completed, the solution was stirred at −5° C. for one hour and then at 20° C. for one and a half hours. The pH was adjusted to 9.5 by addition of 50% KOH and the solution was heated to 60° C. At 60° C. the pH was readjusted to 9.5 by addition 50% KOH. The solution was cooled and filtered. The precipitate was dissolved in ether and the filtrate was extracted with 2× 200 ml. ether. The combined ether solutions were dried over sodium sulfate and evaporated to dryness. The product was recrystallized from benzene-"Skellysolve B." Yield 12 g., M.P. 105–107° C.

12 g. (.07 mole) of 2-bromo-5-methyl-1,3,4-thiadiazole and 5 g. (.07 mole) of thiourea were dissolved in 40 ml. of 100% ethanol and refluxed for one and a half hours on a steam bath. This solution was added to 4.5 g. (.08 mole) of KOH in 65 ml. $H_2O$ and the mixture heated to boiling for five minutes. The ethanol was removed under vacuum and the pH of the aqueous solution adjusted to 3 by addition of 3 N HCl. The product crystallized out and after cooling at 0° C. for one hour was collected by filtration, washed with cold water and recrystallized from 100% ethanol. Yield 5 g., M.P. 186–187° C.

*Analysis.*—Calcd. for $C_3H_4N_2S_2$ (percent): C, 27.25; H, 3.05; N, 21.19; S, 48.51. Found (percent): C, 27.20; H, 3.34; N, 21.18; S, 48.48.

7-amino-3-(5-methyl-1,3,4-thiadiazole-2-ylthiomethyl)-3-cephem-4-carboxylic acid To a stirred suspension of 2.72 g. (0.01 mole) of 7-ACA in 50 ml. of 0.1 M, pH 6.4 phosphate buffer, was added 1.68 g. (0.02 mole) of $NaHCO_3$ followed by 1.45 g. (0.011 mole) of 2-mercapto-5-methyl-1,3,4-thiadiazole and the mixture heated and stirred at 60° C. for five hours. The resulting slurry was the allowed to cool to about 22° C. over a one hour period. The crystalline precipitate was collected by filtration, washed with water and air dried. Yield 1.3 g., dec. pt. 206° C. Scaling up the reaction 10X gave 18.0 g.

*Analysis.*—Calcd. for $C_{11}H_{12}N_4O_3S_3$ (percent): C, 38.37; H, 3.52; S, 27.96. Found (percent): C, 39.06; H, 3.91; S, 26.67.

Synthesis of potassium 1,2,3-triazole-5-thiolate

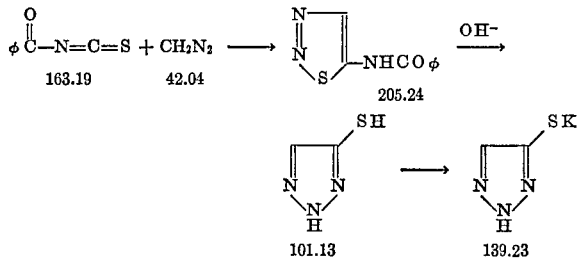

The synthesis of the thiol was accomplished by a procedure essentially identical to that described in the literature [J. Goerdler and G. Gnad, Chem. Ber. 99, 1618 (1966)]

5-benzamido-1,2,3-thiadiazole

To a stirred solution of benzoylisothiocyanate (50.6 g., 310 mmoles) in commercial anhydrous ether (400 ml.), maintained at 0° and in a nitrogen atmosphere, was added dropwise with vigorous stirring, 0.685 N ethereal diazomethane (453 ml., 310 mmoles). When the addition was completed, the mixture was stirred for 1 hour at 0°, the solid was collected by filtration and dried in vacuo. The melting point of the crude material (23.3 g.) thus obtained was observed somewhere in the region 232 to 257°. Goerdler reported M.P. 267° for the pure material. A small second crop (2.1 g.) was obtained by evaporation of the mother liquor in vacuo. The total yield was therefore 40%.

1,2,3-triazole-5-thiol

A solution of the above benzamido compound (8.2 g., 40 mmoles) in 2 N sodium hydroxide (80 ml., 160 mmoles) was heated under reflux temperature in a nitrogen atmosphere for 24 hours. The solution was cooled to 0° in ice, and concentrated hydrochloric acid (26 ml.) was added, while a continuous stream of nitrogen was passed through the solution. The benzoic acid which precipitated was collected by filtration; the filtrate was saturated with sodium chloride and the additional benzoic acid which separated was removed by filtration. The filtrate was immediately extracted with ethyl acetate, the extract was washed with saturated salt solution, dried over magnesium sulfate and then evaporated in vacuo. The viscous oil which remained was immediately evaporatively distilled in vacuo (70–75°/0.001 mm.) to give an oil (2.84 g., 70%) which solidified (M.P. 52–59°; Goerdler reported M.P. 60°) spontaneously.

Potassium 1,2,3-triazole-5-thiolate

To a solution of the above thiol (2.84 g., 28.1 mmoles) in absolute ethanol (28 ml.) was added 1.93 N alcoholic potassium hydroxide solution (14.5 ml.). The solution was then diluted with anhydrous ether until crystallization of the salt was completed. The solid was collected by filtration, washed with ether, and dried in vacuo. The salt obtained in this manner (3.65 g., 93%) had M.P. 225° with decomposition.

It is important to note that the conversion of the benzamido thiadiazole to the triazole thiol is known to proceed via 5-amino-1,2,3-thiadiazole [G. Goerdler and G. Gnad, Chem. Ber. 99, 1618 (1966)].

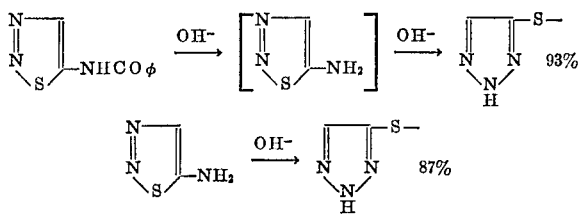

5-amino-1,2,3-thiadiazole can be prepared by an alternative route, not involving diazomethane [D. L. Pain and R. Slack, J. Chem. Soc. 5166 (1965)]

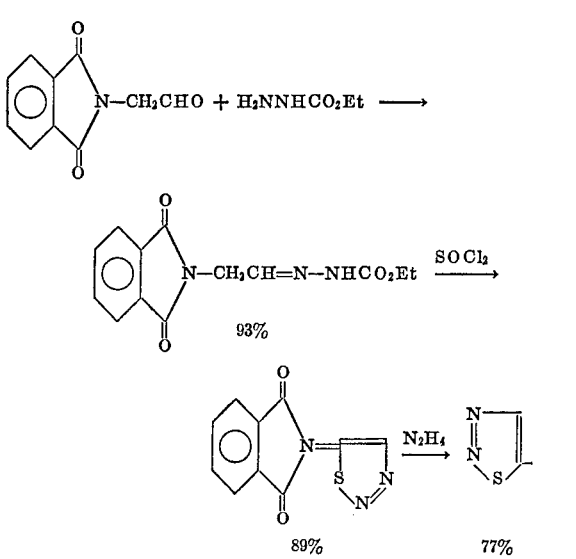

ALTERNATE SYNTHESIS OF 1,2,3-TRIAZOLE-5-THIOL

Preparation of the starting materials

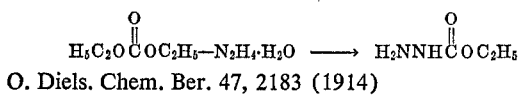

O. Diels. Chem. Ber. 47, 2183 (1914)

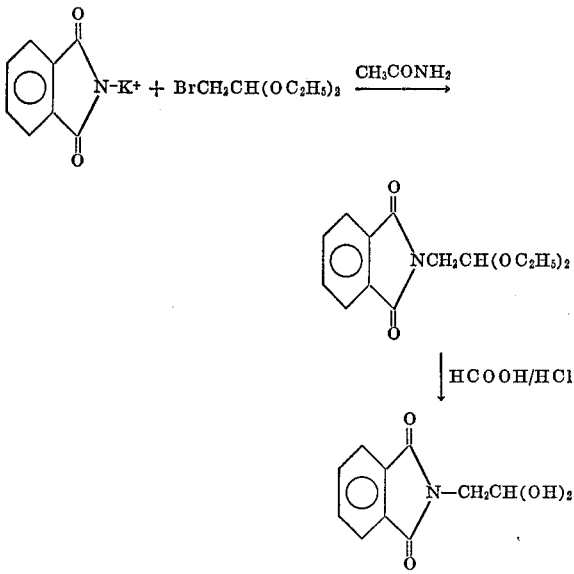

W. Siedel and H. Nahm. Ger. 928,711 (1955); Chem. Abstr. 52, 5471 (1958).

Synthesis of the triazole

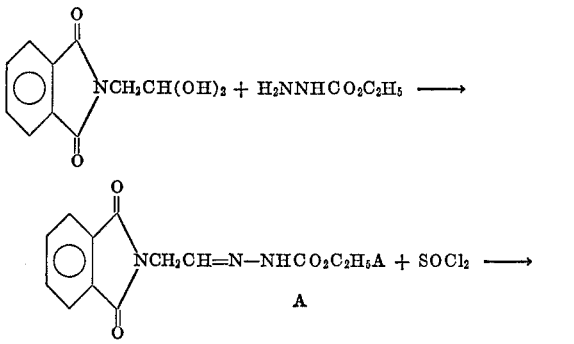

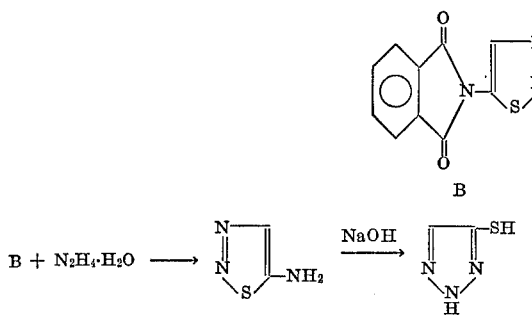

D. L. Pain and R. Slack. J. Chem. Soc. 5166 (1965), G. Goerdler and G. Gnad. Chem. Ber. 99, 1618 (1966).

Ethyl carbazate

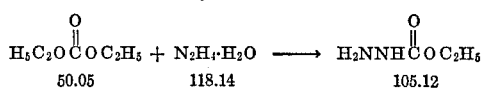

O. Diels. Chem. Ber. 47, 2183 (1914).

Hydrazine hydrate (100%; 44 g.) was added with vigorous stirring over a 10 min. period to diethyl carbonate (100 g.). After a short induction period, the two phase system began to warm up and eventually a clear single phase resulted (ca. 10 min.). The reaction temperature did not exceed 50°. Stirring was continued until a single phase resulted and then the clear solution was set aside for 7 hours (Note 1). The solution was then fractionated in vacuo to give a clear liquid B.P. 93.5–95.5°/10 mm. The distillate (70.1 g., 78.7%) crystallized spontaneously on standing.

Note 1.—A reaction which was left at room temperature for 16 hours gave precisely the same yield of product.

Phthalimidoacetaldehyde hydrate

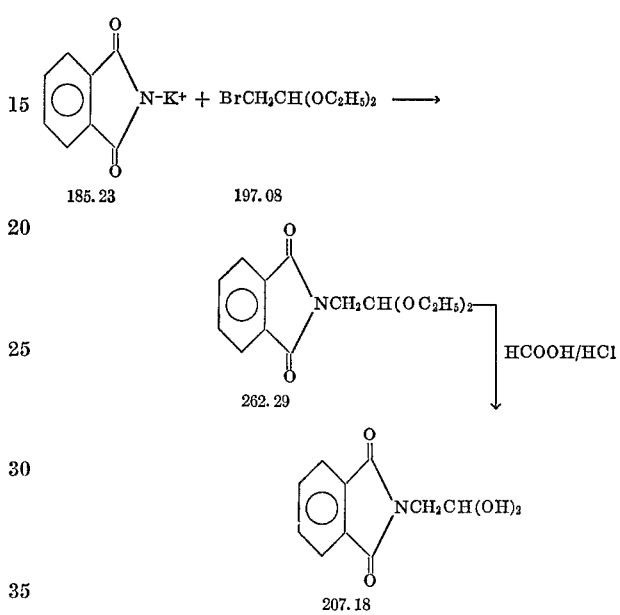

W. Siedel and H. Nahm. Ger. 928,711 (1955); Chem. Abstr. 52, 5471 (1958).

A mixture of dry potassium phthalimide (92.6 g., 500 mmoles) and acetamide (120 g.) was placed in an oil bath maintained at ca. 150°. When the acetamide had melted and stirring became possible (Note 1), bromoacetaldehyde diethyl acetal (98.5 g., 500 mmoles) was added to the stirred mixture over a 2 hour period. When the addition was completed, the mixture was stirred at 140° (reaction temperature for 1 hour, then the oil bath temperature was raised to ca. 180° (reaction temperature 170°). The reaction temperature was held at 170° for ½ hour, the hot mixture was then poured with vigorous stirring into a large volume of ice-water, the solid was collected by filtration, it was washed well with water, and then sucked as dry as possible. This solid was then stirred vigorously with dichloromethane (600 ml.), the insoluble solid was filtered off, the filtrate was dried over sodium sulfate, treated with a few grams of activated charcoal, filtered, and evaporated in vacuo. The residue was broken up, shaken with water and collected by filtration. The solid was pulverized as much as possible while still in the Buchner funnel, it was washed well with water and then dried in vacuo. The crude product, M.P. 60–70° (101.8 g., 77.5%), was used in the next step without purification.

The above acetal (90 g.), 85% formic acid (90 ml.) and concentrated hydrochloric acid (9 ml.), were heated together on an efficient steam bath for 20 minutes (Note 2). The hot solution was diluted with water (810 ml.) and the evaporated in vacuo (water pump, 30°; Note 3) to a volume of about 150 ml. The mixture was cooled in ice, the solid was collected by filtration, washed with ice-cold water, and then dried in vacuo. The white solid thus obtained (65.7 g., 92.4%) melted at ca. 90°, resolidified (Note 4), and then melted again at 106–109°. Evaporation of the filtrate and washings as above gave a further 1.1 g. of a solid M.P. 107–158°. It was advisable to recrystallize this material from a large volume of petroleum ether (B.P. 90–120°) containing a trace of benzene. There was thus obtained a further 0.66 g. of product with M.P. 106–109° (Note 5).

NOTES (1) It was advisable to stir the mixture mechanically.

(2) Shorter heating periods resulted in the recovery of starting material.

(3) Higher temperatures gave more of the high melting material described in the text.

(4) If the melt did not resolidify spontaneously at this stage, the capillary was removed from the melting point apparatus. When the sample had crystallized, it was returned to the apparatus; it then had M.P. 106–109°. This material could be used without purification.

(5) The authors (Siedel and Nahm) reported a melting point of 129° for the hydrate. The material with M.P. ca. 90° then 106–109° described herein, contains the hydrate as indicated by medium intensity absorptions at 3400 cm.$^{-1}$. The recrystallized material, M.P. 106–109°, is evidently the pure aldehyde. This aldehyde is reported (R. J. Collins, B. Ellis, S. B. Hansen, H. S. Mackenzie, R. J. Moualim, V. Petrow, O. Stephenson, and B. Sturgeon. J. Pharm. and Pharmacol. 4, 693 (1952)) to have M.P. 112°.

Phthalimido acetaldehyde ethoxycarbonyl hydrazone

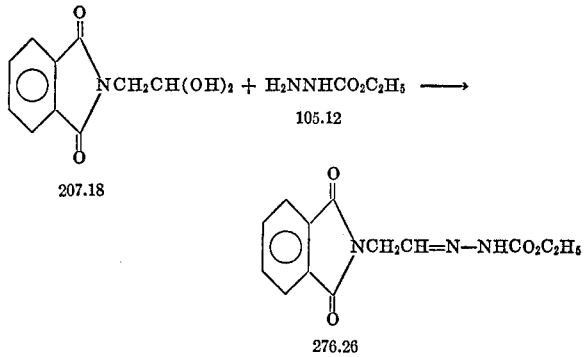

D. L. Pain and R. Slack, J. Chem. Soc. 5166 (1965).

A solution of ethyl carbazate (38.9 g., 370 mmoles) in warm toluene (300 ml.) was added dropwise to a magnetically stirred solution of the aldehyde hydrate (65.7 g., 317 mmoles) in toluene (600 ml.), containing 3 small crystals of toluene sulfonic acid hydrate, over a 15 minute period. The apparatus was maintained in a water bath at 75° during the addition. When the addition was completed, stirring was continued at 75° (bath temperature) for 3 hours, the mixture was then cooled to room temperature, the product was collected by filtration, and dried in vacuo. The white solid (71.0 g., 81.2%) thus obtained had M.P. 160–163° (prior softening), and could be used without further purification. The authors reported that recrystallized material (ethanol) had M.P. 168–169°.

5-phthalimido-1,2,3-thiadiazole

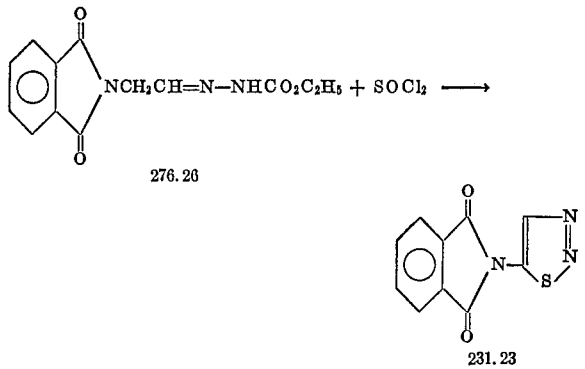

D. L. Pain and R. Slack. J. Chem. Soc. 5166 (1965).

Thionyl chloride (66 ml.) was cooled to ca. 5° and the hydrazone (60 g., 217 mmoles) was added all at once. The cooling bath was removed, and in a short time a vigorous reaction accompanied by a copius evolution of gases ensued. When this subsided, the mixture was set aside at room temperature for 16 hours (the mixture was swirled occasionally to ensure good contact of the reagents). Benzene (300 ml.) was added to the mixture and the whole was evaporated to dryness in vacuo. A further quantity of benzene was added to the residue and the mixture was evaporated to dryness once more. It was usually necessary to repeat this process one more time to completely remove occluded hydrogen chloride. The solid thus obtained was slurried with benzene, collected by filtration, and dried in vacuo. It weighed 40.3 g. (80.4%) and had M.P. 218–221° dec. This material was pure enough to use in the next step, but recrystallization could be accomplished from a large volume of alcohol. It then had M.P. 222–224° dec. The authors reported M.P. 225–226° dec. for the purified material.

5-amino-1,2,3-thiadiazole

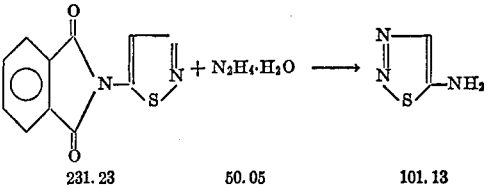

D. L. Pain and R. Slack, J. Chem. Soc. 5166 (1965).

A solution of hydrazine hydrate (100%, 10.5 g.) in absolute ethanol (150 ml.) was added dropwise to a refluxing, mechanically stirred, mixture of the phthalimido compound (23.1 g., 100 mmoles) in absolute ethanol (320 ml.) over a ½ hour period. When the addition was completed, the mixture was stirred under reflux for an additional ½ hour. The mixture was cooled to room temperature, the solid phthalhydrazide was removed by filtration, and the filtrate was concentrated in vacuo to a volume of ca. 70 ml. The precipitated phthalhydrazide was removed by filtration, washed with a little alcohol, and the combined filtrate and washings were evaporated to dryness in vacuo. The residual solid (8.1–10.1 g., 80–100%) was sufficiently pure to be used in the next step. It could, however, be recrystallized from a small volume of alcohol or from a benzene alcohol mixture (3:1) to give a solid M.P. 143–145° dec. The recovery was not good and several additional crops could be obtained by working up the mother liquor. The authors reported M.P. 145–147° for this compound.

1,2,3-triazole-5-thiol

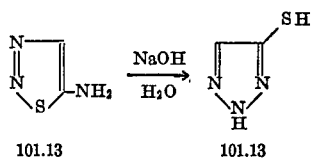

J. Goerdeler and G. Gnad. Chem. Ber. 99, 1618 (1966).

A solution of 5-amino-1,2,3-thiadiazole (4.04 g., 40 mmoles) in 2 N sodium hydroxide (40 ml.) was boiled under reflux in a nitrogen atmosphere for 5 minutes. The solution was cooled in ice (nitrogen was bubbled through the solution throughout the workup period), acidified with 10% hydrochloric acid to pH 1 (indicator paper), saturated with salt, and then extracted as rapidly as possible with ethyl acetate. The extract was dried briefly over magnesium sulfate (nitrogen was bubbled through the extract) and then evaporated in vacuo. The residual oil was immediately (Note 1) subjected to evaporative distillation (80°/0.001 mm.) to give a clear distillation which crystallized spontaneously. The yield of the pure thiol varied between 64 and 84% depending on the purity of the starting thiadiazole.

Note 1.—In the crude state, the thiol is very sensitive to aerial oxidation to the disulfide. The purified thiol possesses considerably more stability and can be kept at 0° in stoppered vessels for several weeks without significant change.

7-amino-3-[S-(1,2,3-triazole-5-yl)-thiomethyl]-3-cephem-4-carboxylic acid (II)

Ten grams (0.075 mole) of 5-mercapto-1,2,3-triazole potassium salt was added to a stirred slurry of 19 g. (0.07 mole) of purified 7-aminocephalosporanic acid and 5.9 g. (0.07 mole) of $NaHCO_3$ in 350 ml. of 0.1 M phosphate buffer (pH 6.5) and the mixture heated and stirred at 55° C. for 3½ hours under a nitrogen atmosphere. The resulting solution was cooled to 22° C. and the pH adjusted to 5.5 with 40% $H_3PO_4$. The resulting precipitate was filtered off, washed with cold water (50 ml.) and air dried. The yield of 7-amino-3-[S-(1,2,3-triazole-5-yl)-thiomethyl]-3-cephem-4-carboxylic acid was 8 g., dec. pt. 230° C. IR analysis showed some decomposition of the β-lactam ring but it was used "as is" for the next step.

Analysis.—Calcd. for $C_{10}H_{11}N_5O_3S_2$ (percent): C, 38.39; H, 3.54. Found (percent): C, 38.36; H, 3.78.

7-amino-3-(2-methyl-1,3,4-thiadiazole-5-thiomethyl)-Δ³-cephem-4-carboxylic acid As disclosed in South Africa 70/2290, to a stirred mixture of 27.2 g. (0.1 mole) of 7-aminocephalosporanic acid in 200 ml. of water and 100 ml. of acetone was added a saturated solution of sodium bicarbonate to a pH of 7.9. This solution was placed in an 80° C. bath and when the internal temperature had reached 45° C. a solution of 19.6 g. (1.15 moles) of 2-methyl-1,3,4-thiadiazole-5-thiol in 200 ml. of acetone was added. The mixture was heated in the 80° C. bath for three hours and then cooled in 10° C. and the pH was adjusted to 3.9 by the addition of 6 N hydrochloric acid. The cold mixture was stirred for 15 minutes and the solid was collected, washed with acetone, and dried. There was obtained 24 g. (70 percent) of 7 - amino-3-(2-methyl-1,3,4-thiadiazole-5-thiomethyl)-Δ³-cephem-4-carboxylic acid.

7-amino-3-(1-methyl-1,2,3,4-tetrazole-5-thiomethyl)-Δ³-cephem-4-carboxylic acid The above preparation was repeated using 1-methyl-1,2,3,4-tetrazole-5-thiol instead of the thiadiazole. There was obtained 25 g. (76 percent) of 7-amino-3-(1-methyl-1,2,3,4-tetrazole-5-thiomethyl)-Δ³-cephem - 4 - carboxylic acid. The preparation of this same compound is also described in U.S. Pat. 3,516,997 in column 6 under the heading "Preparation 7."

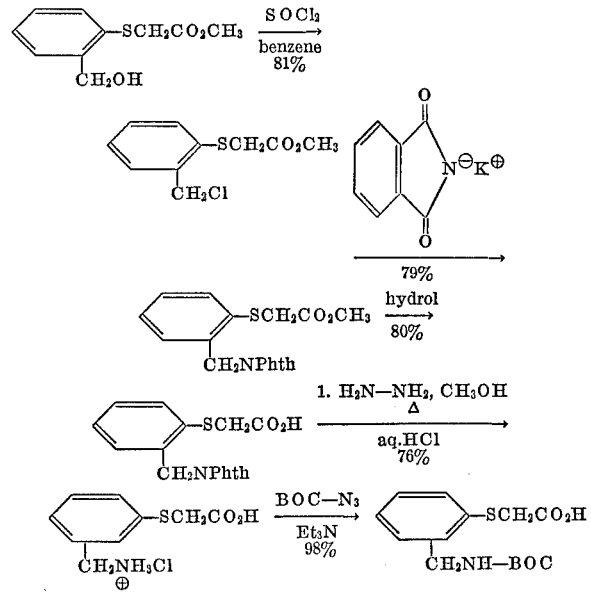

Methyl (o-chloromethylphenylthio)acetate

A solution of crude methyl (o-hydroxymethylphenylthio)acetate (161.5 g., 0.76 mole) in 150 ml. of benzene was added dropwise with stirring to 250 ml. of thionyl chloride, cooled in ice. After the addition was completed (30 min.) the mixture was left at room temperature for 1 h., then the solvent was removed and the residue distilled in vacuo to give 144.3 g. (81%) of pale yellow liquid, B.P. 117–120° (0.1 mm.).

Methyl (o-phthalimidomethylphenylthio)acetate

A mixture of methyl (o-chloromethylphenylthio)acetate (79.6 g., 0.345 mole), potassium phthalimide (63.8 g., 0.345 mole) and 500 ml. of DMF was heated with stirring at 50–55° for 4 h. The mixture was concentrated to dryness and the residue treated with ethyl acetate and water. The ethyl acetate solution was dried, concentrated and cooled to give a white solid precipitate which was collected by filtration; yield 92.9 g. (79%), M.P. 94–96°.

(o-Phthalimidomethylphenylthio)acetic acid

6 N hydrochloric acid (500 ml.) was added in portions to a stirred solution of methyl (o-phthalimidomethylphenylthio)acetate (136.6 g., 0.40 mole) in 1200 ml. of acetic acid at 40–50°. The reaction mixture was left at room temperature overnight, cooled in ice and the white solid collected by filtration. The product, after washing with water and drying, was recrystallized from ethyl acetate-acetone (10:1); yield 104.9 g. (80%), M.P. 171–176°. Another recrystallization from ethyl acetate raised the melting point to 177–179°.

Analysis.—Calcd. for $C_{17}H_{13}NO_4S$ (percent): C, 62.38; H, 4.00; N, 4.28; S, 9.80.

Found (percent): C, 62.53; H, 4.16; N, 4.21; S, 10.04.

(o-Aminomethylphenylthio)acetic acid hydrochloride

To a warm solution of (o-phthalimidomethylphenylthio)acetic acid (54.8 g., 0.168 mole) in 1000 ml. of methanol was added 97% hydrazine (5.4 g., 0.168 mole). The reaction mixture was heated under reflux for 16 h., then concentrated to dryness. The solid residue was repeatedly extracted with warm 2 N hydrochloric acid and the extract concentrated to dryness giving 29.8 g. (76%) of white solid residue, M.P. 212–216° (decomp.); N.M.R. (D₂O): τ 2.69 (m, 4H), 5.74 (s, 2H) and 6.28 (s, 2H).

(o-Tert-butoxycarbonylaminomethylphenylthio)acetic acid

To a solution of the amino acid hydrochloride (16.2 g., 0.069 mole) in 170 ml. of water, cooled in ice, was added triethylamine (22.3 g., 0.221 mole) followed by a solution of tert-butoxycarbonyl azide (11.9 g., 0.083 mole) in 100 ml. of THF. The mixture was stirred at room temperature for 16 h., then concentrated and washed with ether. The aqueous solution was layered with 150 ml. of ethyl acetate, cooled in ice and brought to pH 2.5 with dilute hydrochloric acid. The ethyl acetate solution was dried and the solvent removed to give 20.0 g. (98%) of liquid residue which very slowly crystallized to a white solid, M.P. 70–75°.

Analysis.—Calcd. for $C_{14}H_{19}NO_4S$ (percent): C, 56.54; H, 6.44; N, 4.71; S, 10.78. Found (percent): C, 56.62; H, 6.32; N, 4.64; S, 10.77.

The following examples are given in illustration of, but not in limitation of, the present invention. All temperatures are in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

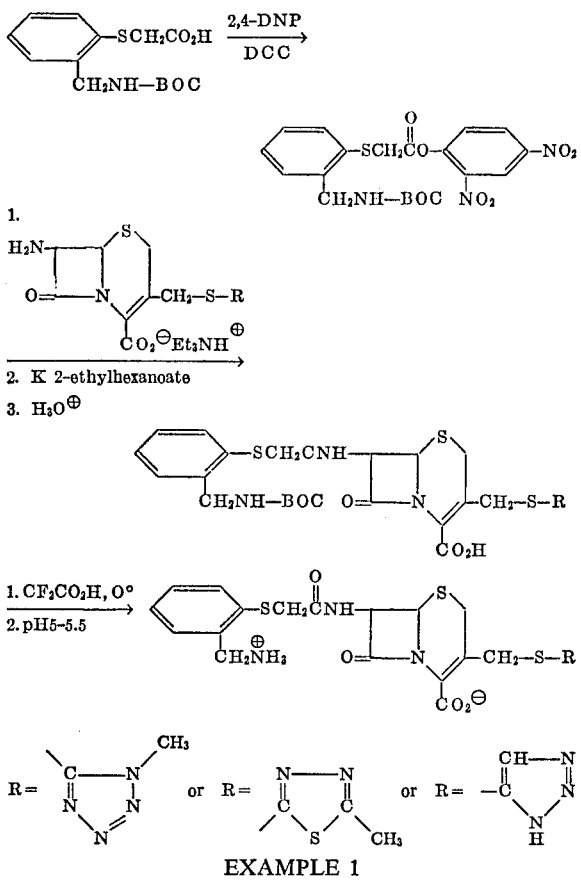

EXAMPLE 1

7-(o-aminomethylphenylthioacetamido)-3-[(1-methyl-5-tetrazolylthio)methyl]ceph-3-em-4-carboxylic acid N,N'-dicyclohexylcarbodiimide (2.06 g., 0.010 mole) was added to a solution of (o-tert.-butoxycarbonylaminomethylphenylthio)acetic acid (3.0 g., 0.010 mole) and 2,4-dinitrophenol (1.84 g., 0.010 mole) in 25 ml. of ethyl acetate, cooled in ice. The reaction mixture was kept at 0° for 30 min., then at 25° for an additional 30 min. The precipitated N,N'-dicyclohexylurea was removed by filtration. The solvent was removed from the filtrate to give the crude activated ester as a yellow oil. A solution of 7-amino-3-[(1-methyl - 5 - tetrazolylthio)methyl]ceph - 3 - em-4-carboxylic acid (3.3 g., 0.010 mole) and triethylamine (2.0 g., 0.020 mole) in 25 ml. of methylene chloride was added in one portion to the activated ester, cooled at 0°. The reaction mixture was stirred at room temperature for 2 h. A small amount of insoluble material was removed by filtration and the filtrate diluted with ether. The oily precipitate was twice redissolved in methylene chloride (25 ml.) and reprecipitated with ether (200 ml.), causing it to crystallize. The triethylammonium cephalosporanate was dissolved in 30 ml. of methanol and this solution treated with 5 ml. of 2.3 M solution of potassium 2-ethylhexanoate in n-butyl alcohol, followed by the addition of ether (200 ml.). The potassium cephalosporanate was collected by filtration and amounted to 5.4 g. A solution of it in 100 ml. of water was layered with 100 ml. of ethyl acetate, cooled in ice and with stirring brought to pH 2.5 with dilute hydrochloric acid. The free cephalosporanic acid (4.7 g.) was obtained as a foam after drying of the ethyl acetate solution and removal of the solvent. It was treated with 30 ml. of trifluoroacetic acid at 0°, left at 0° for 1 h., then diluted with ether. The solid precipitate (3.6 g.) was collected, washed with ether and dissolved in a mixture of 30 ml. of water and 30 ml. of acetone. The solution was adjusted to pH 5.0 with 3 N ammonium hydroxide and concentrated under reduced pressure. The solid precipitate was collected by filtration and washed with ice-water, acetone and ether successively. It was finally dried in vacuo over $P_2O_5$ to give 1.8 g. (36%) of 7-(o-aminomethylphenylthioacetamido)-3-[(1-methyl-5-tetrazolylthio)methyl]ceph-3-em - 4 - carboxylic acid as a pale yellow solid;

$\gamma^{Nujol}_{max.}$ 1775 cm.$^{-1}$ (β-lactam carbonyl) and 1660 cm.$^{-1}$ (amide carbonyl)

The N.M.R. spectrum was also in agreement with the assigned structure. On the basis of the spectral data and the thin-layer chromatogram the purity of the material was estimated at 80%.

EXAMPLE 2

7-(o - aminomethylphenylthioacetamido)-3-[5-methyl-1,3,4 - thiadiazolylthio)methyl]ceph-3-em-4-carboxylic acid This cephalosporin was prepared in 21% yield by the same procedure given in detail in Example 1 but using 7-amino-3-[(5-methyl - 1,3,4 - thiadiazolylthio)methyl] ceph-3-em-4-carboxylic acid;

$\gamma^{Nujol}_{max.}$ 3300 (NH), 1760 (β-lactam carbonyl) and 1650 cm.$^{-1}$ (amide carbonyl)

The N.M.R. spectrum in trifluoroacetic acid consisted of a seven-proton multiplet at τ 2.0–3.0 (phenyl and NH$_3$ protons), a one-proton multiplet at τ 4.15–4.5 (C$^7$—H), a one proton doublet (J=4.5 Hz.) at τ 4.85 (C$^6$—H) a four-proton multiplet at τ 5.15–5.6 (overlapping signals of aminomethylene and 3—CH$_2$S— protons), two-proton singlets at τ 6.00 (S—CH$_2$CO—) and 6.24 (>C$^2$H$_2$), and a three proton singlet at τ 6.88 (CH$_3$). On the basis of the spectral data and the thin-layer chromatogram the purity was estimated at 90%.

EXAMPLE 3

7-(o-aminomethylphenylthioacetamido)-3-[S-(1,2,3-triazole-5-yl)-thiomethyl]-ceph-3-em-4-carboxylic acid This cephalosporin is prepared by the same procedure given in detail in Example 1 but using an equimolar weight of 7-amino-3-[S - (1,2,3,triazole-5-yl)thiomethyl] ceph-3-em-4-carboxylic acid.

EXAMPLE 4

A suspension of the zwitterionic form of 7-(o-aminomethylphenylthioacetamido)-3-[(1 - methyl-5-tetrazolylthio)methyl]ceph-3-em-4-carboxylic acid (0.361 g.) in 3 ml. of methanol is cooled in ice and treated with a few drops of concentrated hydrochloric acid until a clear solution is obtained. 7 - (o - aminomethylphenylthioacetamido)-3-[(1-methyl - 5 - tetrazolylthio)methyl]ceph-3-em-4-carboxylic acid hydrochloride precipitates as a pale brown colored solid upon the addition of ether and is collected by filtration and dried in vacuo over $P_2O_5$.

The hydrochlorides of 7-(o-aminomethylphenylthioacetamido)-3-[(5 - methyl-1,3,4-thiadiazolylthio)methyl] ceph-3-em-4-carboxylic acid and 7-(o-aminomethylphenylthioacetamido)-3-[S-(1,2,3 - triazole-5-yl)-thiomethyl] ceph-3-em-4-carboxylic acid are prepared in the same manner.

EXAMPLE 5

To a stirred suspension of the zwitterionic form of 7-(o-aminomethylphenylthioacetamido) - 3 - [(1-methyl-5-tetrazolylthio)-methyl]ceph-3-em-4-carboxylic acid (0.361 g.) is added 1 N aqueous sodium hydroxide at room temperature until a clear solution (pH 10.8) is obtained. This solution is immediately freeze-dried to give impure, solid sodium 7-(o-aminomethylphenylthioacetamido) - 3 - [(1-methyl-5-tetrazolylthio)methyl]ceph-3-em-4-carboxylate.

The sodium salts of 7-(o-aminomethylphenylthioacetamido)-3-[(5-methyl-1,3,4-thiadiazolylthio)methyl]ceph-3-em-4-carboxylic acid and 7-(o-aminomethylphenylthioacetamido)-3-[S-(1,2,3 - triazole-5-yl)-thiomethyl]-ceph-3-em-4-carboxylic acid are prepared in the same manner.

Samples of 7-(o-aminomethylphenylthioacetamido)-3-[(1 - methyl-5-tetrazolylthio)methyl]ceph-3-em-4-carboxylic acid (called New Cpd. No. 1) and 7-(o-aminomethylphenylthioacetamido)-3-[(5 - methyl-1,3,4-thiadiazolylthio)methyl]ceph-3-em-4-carboxylic acid (called New Cpd. No. 2) after solution in dimethyl - sulfoxide (DMSO) followed by dilution with Nutrient Broth were found to exhibit the following Minimum Inhibitory Concentrations (M.I.C.) in mcg./ml. versus the indicated microorganisms as determined by overnight incubation at 37° C. by Tube Dilution. Results with cephalothin are also given.

| Organism | | Experiment— No. 1 | No. 2 | Ceph- alo- thin |
|---|---|---|---|---|
| *Str. pyogenes* plus 5% serum [1] | A9604 | .04 | .01 | .08 |
| *S. aureus* Smith | A9537 | .08 | .08 | .16 |
|  |  | .16 | .04 | .16 |
| *S. aureus* Smith plus 50% serum | A9537 | .08 | .16 | .3 |
|  |  | .3 | .3 | .6 |
| *S. aureus* BX1633-2 at $10^{-3}$ dil'n | A9606 | .32 | .16 | .3 |
|  |  | .3 | .16 | .3 |
| *S. aureus* BX1633-2 at $10^{-2}$ dil'n | A9606 | 1 | 1 | .6 |
|  |  | .5 | <.25 | .6 |
| *S. aureus* meth.-resistant | A15097 | .5 | 2 | 1.3 |
| *Sal. enteritidis* | A9531 | <.25 | <.25 | .3 |
|  |  | .08 | .16 | .3 |
| *E. coli* Juhl | A15119 | .5 | .5 | 16 |
|  |  | <.25 | <.25 | 8 |
| *E. coli* | A9675 | 1 | 4 | 32 |
|  |  | 4 | 2 | 63 |
| *K. pneumoniae* | A9977 | <.25 | <.25 | <.5 |
|  |  | .16 | .3 | <.25 |
| Do | A15130 | 2 | 2 | 16 |
|  |  | 1 | <.25 | 16 |
| *Pr. mirabilis* | A9900 | .5 | <.25 | <.5 |
|  |  | .5 | .6 | <.25 |
| *Pr. morganii* | A15153 | <.25 | 32 | >250 |
|  |  | 10 | 16 | >125 |
| *P. aeruginosa* | A9843A | >125 | >125 | >250 |
|  |  | >125 | >125 | >125 |
| *Ser. marcescens* | A20019 | 2 | >125 | >250 |
|  |  | 125 | 125 | >125 |

[1] 50% nutrient broth, 45% antibiotic assay broth.

7-(o-aminomethylphenylthioacetamido) - 3 - [(1-methyl-5-tetrazolylthio)methyl]ceph - 3 - em-4-carboxylic acid and 7-(o-aminomethylphenylthioacetamido)-3-[(5-methyl-1,3,4-thiadiazolylthio)methyl]ceph - 3-em-4-carboxylic acid were well absorbed in mice upon parenteral, but not oral, administration. A lower minimum dose ($CD_{50}$) of each of these two compounds than of cephalothin was required by subcutaneous administration in two doses to cure 50% of groups of mice infected with *Str. pyogenes* (A9604) or *E. coli* Juhl (A15119).

We claim:
1. A compound of the formula

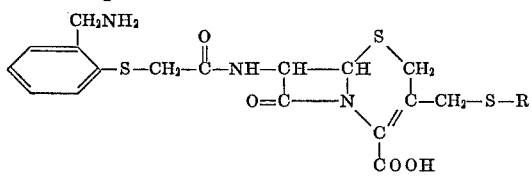

wherein R is

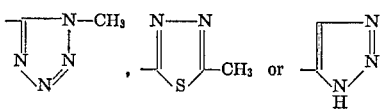

or a nontoxic, pharmaceutically acceptable salt thereof.

2. The compound of the formula

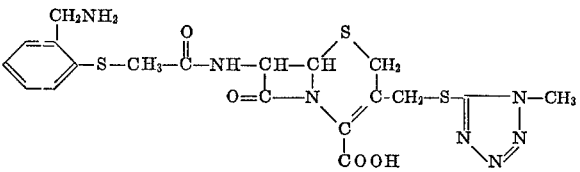

3. The sodium salt of the compound of claim 2.
4. The potassium salt of the compound of claim 2.
5. The hydrochloride of the compound of claim 2.
6. The zwitterion form of the compound of claim 2.
7. A nontoxic, pharmaceutically acceptable acid addition salt of the compound of claim 2.
8. The compound of the formula

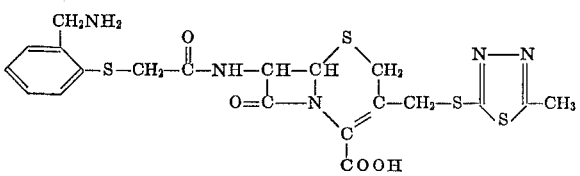

9. The sodium salt of the compound of claim 8.
10. The potassium salt of the compound of claim 8.
11. The hydrochloride of the compound of claim 8.
12. The zwitterion form of the compound of claim 8.
13. A nontoxic, pharmaceutically acceptable acid addition salt of the compound of claim 8.
14. The compound of the formula

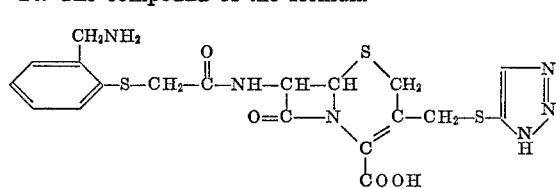

15. The sodium salt of the compound of claim 14.
16. The potassium salt of the compound of claim 14.
17. The hydrochloride of the compound of claim 14.
18. The zwitterion form of the compound of claim 14.
19. A nontoxic, pharmaceutically acceptable acid addition salt of the compound of claim 14.

References Cited
UNITED STATES PATENTS

| 3,365,449 | 1/1968 | Takand et al. | 260—243 C |
| 3,657,232 | 4/1972 | Lemieux et al. | 260—243 C |
| 3,641,021 | 2/1972 | Ryan | 260—239.1 |
| 3,663,540 | 5/1972 | Lemieux et al. | 260—243 C |

NICHOLAS S. RIZZO, Primary Examiner

U.S. Cl. X.R.

424—246